US011001332B2

(12) United States Patent
Hendey (10) Patent No.: US 11,001,332 B2
(45) Date of Patent: May 11, 2021

(54) THERMALLY CONDUCTIVE AND COMPLIANT ELASTOMERIC DEVICES, SYSTEMS, AND METHODS FOR MOUNTING HEAT GENERATING COMPONENTS INSIDE A TUBULAR FRAME

(71) Applicant: Matthew Hendey, Indianapolis, IN (US)

(72) Inventor: Matthew Hendey, Indianapolis, IN (US)

( * ) Notice: Subject to any disclaimer, the term of this patent is extended or adjusted under 35 U.S.C. 154(b) by 244 days.

(21) Appl. No.: 16/428,015

(22) Filed: May 31, 2019

(65) Prior Publication Data

US 2019/0283833 A1 Sep. 19, 2019

Related U.S. Application Data

(63) Continuation of application No. 15/936,053, filed on Mar. 26, 2018, now Pat. No. 10,689,056, which is a
(Continued)

(51) Int. Cl.
| | |
|---|---|
| *B62K 19/18* | (2006.01) |
| *B62J 1/08* | (2006.01) |
| *B62K 11/02* | (2006.01) |
| *B62K 19/34* | (2006.01) |
| *B62M 6/40* | (2010.01) |
| *B62M 6/55* | (2010.01) |
| *B62K 19/32* | (2006.01) |

(Continued)

(52) U.S. Cl.
CPC .............. *B62K 19/18* (2013.01); *B62J 1/08* (2013.01); *B62K 11/02* (2013.01); *B62K 19/32* (2013.01); *B62K 19/34* (2013.01); *B60K 1/04* (2013.01); *B60Y 2200/13* (2013.01); *B62M 6/40* (2013.01); *B62M 6/55* (2013.01); *B62M 6/90* (2013.01)

(58) Field of Classification Search
CPC ...... B60K 1/04; B60Y 2200/13; B62K 19/18;
B62K 19/32; B62K 11/02; B62K 19/34;
B62J 1/08; B62M 6/90; B62M 6/40;
B62M 6/55; H02K 5/18; H02K 5/20;
H02K 9/18; H02K 9/22; H02K 9/227;
H02K 2209/00
USPC ......... 165/80.3, 177; 180/206.4; 310/64, 89, 310/216.056; 361/704; 362/373
See application file for complete search history.

(56) References Cited

U.S. PATENT DOCUMENTS

| | | | |
|---|---|---|---|
| 6,919,504 B2 | 7/2005 | McCutcheon et al. | |
| 2003/0067228 A1* | 4/2003 | Vanjani | H02K 11/33 310/64 |
| 2004/0118579 A1* | 6/2004 | McCutcheon | H01L 23/3735 174/16.3 |

* cited by examiner

*Primary Examiner* — Tony H Winner
*Assistant Examiner* — Felicia L. Brittman
(74) *Attorney, Agent, or Firm* — Roberts IP Law; John Roberts (57) ABSTRACT

A system and bicycle incorporating same mounts a heat-generating component such as a motor, motor controller, or battery pack, inside a frame tube using a thermally conductive and compliant elastomeric device comprising a base portion having a relatively smooth first side and regularly-repeating protrusions extending away from a second side, wherein the relatively smooth side of the elastomeric device is wrapped around the heat-generating component such that the regularly-repeating protrusions will be in an interference fit with the interior surface of the tubular frame when the heat-generating component is mounted in the frame tube, thereby conducting heat to the frame to exhaust to the
(Continued)

environment, providing compliance that allows for dimensional variation of assembled parts, and muting noise and vibration.

20 Claims, 4 Drawing Sheets

Related U.S. Application Data continuation-in-part of application No. 15/098,502, filed on Apr. 14, 2016, now Pat. No. 10,137,954.

(60) Provisional application No. 62/478,791, filed on Mar. 30, 2017, provisional application No. 62/147,356, filed on Apr. 14, 2015.

(51) Int. Cl.
*B62M 6/90* (2010.01)
*B60K 1/04* (2019.01)

THERMALLY CONDUCTIVE AND COMPLIANT ELASTOMERIC DEVICES, SYSTEMS, AND METHODS FOR MOUNTING HEAT GENERATING COMPONENTS INSIDE A TUBULAR FRAME

CROSS-REFERENCE TO RELATED APPLICATIONS

This application claims priority to and incorporates herein by reference, both U.S. patent application Ser. No. 15/936,053 to Hendey, filed Mar. 26, 2018 ("the '053 application"), and the provisional patent application to which the '053 application claims priority, namely U.S. Pat. App. Ser. No. 62/478,791 to Hendey et al., filed Mar. 30, 2017. This application also claims priority to, is a continuation-in-part of, and incorporates herein by reference, both U.S. patent application Ser. No. 15/098,502 to Hendey et al., filed Apr. 14, 2016 and published on Oct. 20, 2016 as US 2016/0303961 A1 ("the '502 application"), and the provisional patent application to which the '502 application claims priority, U.S. Pat. App. Ser. No. 62/147,356 to Hendey et al., filed Apr. 14, 2015.

FEDERALLY SPONSORED RESEARCH OR DEVELOPMENT

None.

TECHNICAL FIELD

The present invention relates generally to tubular frames for bicycles, motorcycles, and the like, and more particularly to thermally conductive and radially compliant elastomeric devices, systems, and methods for mounting heat generating components, such as electric motors, controllers, gear drives, or battery packs, for instance, inside a tubular frame.

BACKGROUND

During operation of an electric bicycle, there are efficiency losses from electrical, electromagnetic, and mechanical systems that generate waste heat that must be effectively transferred to the surrounding atmosphere to avoid overheating. This heat can be significant, especially when the system is operated at or near full performance capacity. Significant heat-producing components can include motors, motor controllers, gear trains, and battery packs, for example. The electric bicycles disclosed in the materials incorporated herein by reference mount some or all of these heat-generating components partially or completely inside one or more hollow tubes of a tubular frame, the interior of which may be partially or entirely closed off from the external atmosphere.

Mounting heat-generating components inside one or more hollow tubes of a tubular frame presents important heat dissipation issues, because the components may overheat if they cannot effectively transfer their excess heat to the external atmosphere outside the frame. Placing the heat-generating components directly against the interior surfaces of a heat-conducting frame (such as an aluminum tubular frame) can be used to attempt to directly conduct heat from the heat-generating components to the interior surfaces of the frame, so the frame can then conduct the heat to the lower-temperature exterior surfaces of the frame and then by convection to the lower-temperature external atmosphere.

However, placing the heat-generating components directly against the interior surfaces of the frame presents numerous difficult problems, because dimensional variation due to the stacking of manufacturing tolerances and materials having different thermal expansion rates make it difficult and expensive to attempt to design and manufacture an assembly of heat-generating electrical components that will perfectly mate against contoured surfaces of the interior of frame tubes, which surfaces often include imperfections and dimensional irregularities. Further, to the extent the heat-generating components are mounted directly against the interior surfaces of the frame tubes, undesirable vibrations and noises created by the heat-generating components are transferred directly to, and often amplified by, the frame.

Accordingly, a need exists for an improved way to mount heat-generating components inside one or more hollow tubes of a tubular frame.

SUMMARY

The present invention(s) elegantly overcome many of the drawbacks of prior systems and provide numerous additional improvements and benefits as will be apparent to persons of skill in the art. For example, provided in various example embodiments is a system for mounting a heat-generating component having an exterior surface defining an outer profile at least partially inside a frame tube having an interior surface defining an inner profile, comprising: a thermally conductive and compliant elastomeric device comprising a base portion having a relatively smooth first side and regularly-repeating protrusions extending away from a second side opposite the first side; wherein the thermally conductive and compliant elastomeric device is wrapped at least substantially around the outer profile of the heat-generating component such that the relatively smooth first side of the thermally conductive and compliant elastomeric device is in substantially continuous physical contact with the outer profile of the heat-generating component, and the regularly-repeating protrusions extend away from the heat-generating component such that the regularly-repeating protrusions will be in an interference fit with the interior surface of the tubular frame when the heat-generating component is mounted at least partially inside the frame tube.

In various example embodiments the frame tube may be part of a bicycle frame. In various example embodiments the heat-generating device may comprise an electric motor, or an electric motor controller, or both. In various example embodiments the outer profile of the heat-generating component may have a generally circular cross-section. In various example embodiments the inner profile of the frame tube may have a generally circular cross-section. In various example embodiments the regularly-repeating protrusions may form longitudinally-extending ridges extending across the second side of the thermally conductive and compliant elastomeric device. In various example embodiments the longitudinally-extending ridges may curve in an undulating wave pattern as they extend across the second side of the thermally conductive and compliant elastomeric device. In various example embodiments the regularly-repeating protrusions may have a cross-section where a portion of protrusion closest to the second side is wider than a portion of protrusion furthest from the second side. In various example embodiments the thermally conductive and compliant elastomeric device may form a longitudinally-extending relief allowing for the passage of wiring between the outer profile of the heat-generating component and the inner profile of the frame tube when the heat-generating component is mounted at least partially inside the frame tube. In various example embodiments the thermally conductive and compliant elastomeric device may comprise a planar slab of flexible material wrapped at least substantially around the outer profile of the heat-generating component. In various example embodiments the thermally conductive and compliant elastomeric device may comprise a one-piece longitudinally-extending annulus sized to allow the thermally conductive and compliant elastomeric device to stretch around and compressively engage against the heat-generating component.

Also provided in various example embodiments is a bicycle that receives at least part of its motive power from an electric motor, comprising a frame having a tube with an interior surface defining an inner profile, and a system for mounting a heat-generating component having an exterior surface defining an outer profile at least partially inside tube of the frame, comprising: a thermally conductive and compliant elastomeric device comprising a base portion having a relatively smooth first side and regularly-repeating protrusions extending away from a second side opposite the first side; wherein the thermally conductive and compliant elastomeric device is wrapped at least substantially around the outer profile of the heat-generating component such that the relatively smooth first side of the thermally conductive and compliant elastomeric device is in substantially continuous physical contact with the outer profile of the heat-generating component, and the regularly-repeating protrusions extend away from the heat-generating component such that the regularly-repeating protrusions are in an interference fit with the interior surface of the tubular frame when the heat-generating component is mounted at least partially inside the frame tube.

In various example embodiments of the bicycle the frame tube is a seat tube. In various example embodiments the heat-generating device comprises an electric motor. In various example embodiments the heat-generating device comprises an electric motor controller. In various example embodiments the outer profile of the heat-generating component has a generally circular cross-section, and the inner profile of the frame tube has a generally circular cross-section. In various example embodiments the regularly-repeating protrusions form longitudinally-extending ridges extending across the second side of the thermally conductive and compliant elastomeric device. In various example embodiments the longitudinally-extending ridges curve in an undulating wave pattern as they extend across the second side of the thermally conductive and compliant elastomeric device. In various example embodiments the thermally conductive and compliant elastomeric device comprises a one-piece longitudinally-extending annulus sized to allow the thermally conductive and compliant elastomeric device to stretch around and compressively engage against the heat-generating component.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

DETAILED DESCRIPTION OF EXAMPLE EMBODIMENTS

Reference will now be made in detail to some specific example embodiments, including any best mode contemplated by the inventor. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments may be implemented without some or all of these features or specific details. In other instances, components and procedures well known to persons of skill in the art have not been described in detail in order not to obscure inventive aspects.

Various techniques and mechanisms will sometimes be described in singular form for clarity. However, it should be noted that some embodiments may include multiple iterations of a technique or multiple components, mechanisms, and the like, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described.

Further, the example techniques and mechanisms described herein will sometimes describe a connection, relationship or communication between two or more items or entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

While various example embodiments of the present invention may be applicable to many different types of heat generating components located at least partially within the tubes of many different types of frames for many different applications, to illustrate one example embodiment a first example thermally conductive and compliant elastomeric device configured according to various example embodiments for mounting heat generating components inside a tubular frame will be described. It is understood that hollow tubes of a tubular frame may comprise outer and inner profiles having any combination of cross-sectional shapes, including round, (circular or annular), oval, square, octagonal, rectangular, square or rectangular with radiused corners, irregular profiles, and profiles that change as they extend longitudinally, such as tapered shapes, including for instance conical, pyramidal, or frustrum shapes, or any other suitable cross-sectional shapes.

Figure 1:
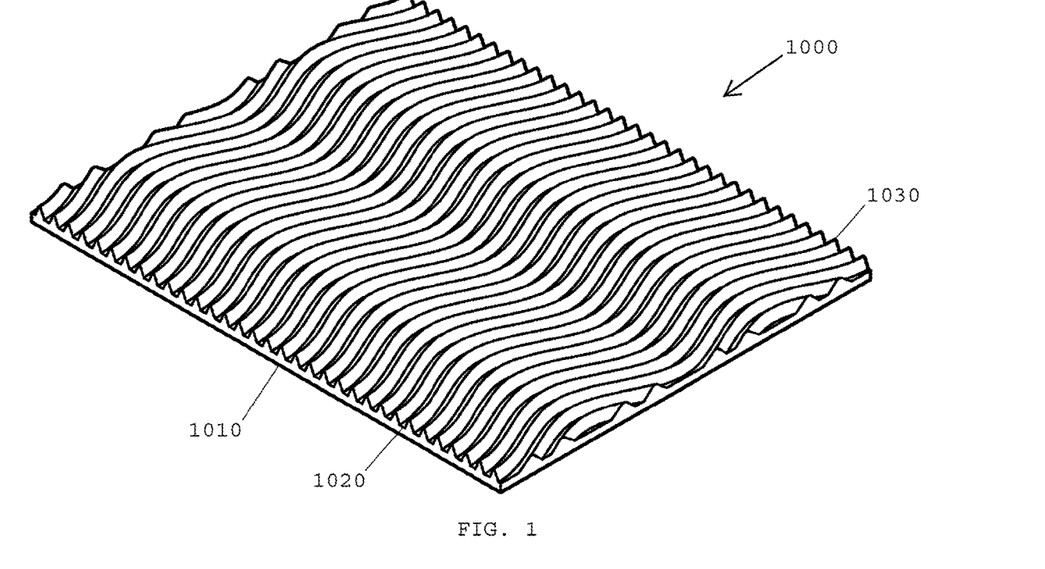
FIG. 1 is a top perspective view of a first example thermally conductive and compliant elastomeric device configured according to various example embodiments for mounting heat generating components inside a tubular frame.
Figure 2:
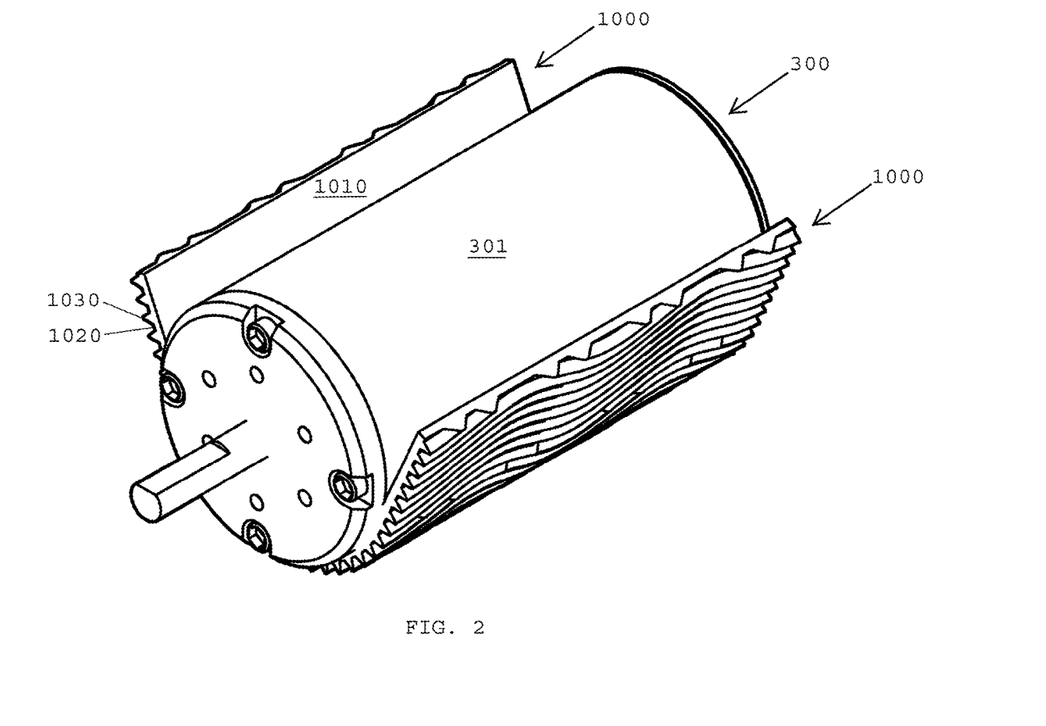
FIG. 2 is a top perspective view of a heat generating component, namely an electric motor, depicting installation thereon of the first example thermally conductive and compliant elastomeric device of FIG. 1, according to various example embodiments.

With reference to FIGS. 1 and 2, provided is a specially-designed, thermally conductive, compliant, flexible, resilient, elastomeric component 1000 comprising a planar base portion having a relatively smooth first side 1010 and regularly-repeating protrusions 1030 extending away from a second side 1020 opposite the first side 1010. In the example embodiment shown in the figures, the protrusions 1030 form longitudinally-extending ridges or ribbing extending across the second side 1020. The longitudinally-extending ridge protrusions 1030 may curve in an undulating wave pattern as they extend across the second side 1020. Longitudinally-extending ridge protrusions 1030 that all extend in an single direction can create a directional bias during insertion of the assembly into the tubing of a bicycle frame, for instance when the protrusions 1030 all compress or fold-over in the same direction. Accordingly, a wave pattern as shown in the figures may be employed, which tends to make any folding-over of the protrusions 1030 multi-directional, and this reduces resistance when trying to rotate the motor 300 and motor controller 400 for final positioning within the tubing of the frame. Alternatively, the longitudinally-extending ridge protrusions 1030 may extend straight across the second side 1020, or in a zig-zag pattern, or in a diamond or crisscross pattern, or any other suitable arrangement (not shown). In further alternative embodiments, the protrusions 1030 may comprise individual pyramids, columns, hemispheres, or other shapes (not shown), arranged in a pattern, instead of the example longitudinally-extending ridges shown in the figures. The protrusions 1030 may have a cross-section where the portion of protrusion 1030 closest to the second side 1020 is wider than the portion of protrusion 1030 furthest from the second side 1020, to tend to resist folding-over of the protrusions 1030 when they are deflected.

With reference to FIG. 2, the material and geometry of the thermally conductive, compliant, flexible, resilient, elastomeric component 1000 may be selected to allow the elastomer component 1000 to wrap around a heat-generating component such as an electric motor 300, such that the relatively smooth first side 1010 is bendable into a cylindrical (or other) shape and forms thermally-effective and substantially continuous physical contact with an outer profile 301 of the electric motor 300 or other heat-generating component that is to be mounted within the tubing of a frame. Elastomeric component 1000 as shown in FIGS. 1 and 2 may be formed to bend into other shapes in addition to cylindrical shapes to mate against different outer profiles of different heat-generating components and different inner profiles of frame tubes, including for example shapes comprising outer and inner profiles having any combination of cross-sectional shapes, including round, (circular or annular), oval, square, octagonal, rectangular, square or rectangular with radiused corners, irregular profiles, and profiles that change as they extend longitudinally, such as tapered shapes, including for instance conical, pyramidal, or frustrum shapes, or any other suitable cross-sectional shapes. In one example embodiment, the elastomer component 1000 is molded from CoolPoly® D8102 available from Celanese Corporation, with a thermal conductive value of 3 w/mk. Alternatively, materials may possibly be used as described in U.S. Pat. No. 6,919,504 B2 to McCutcheon, et al. ("McCutcheon et al."), the entirety of which is incorporated herein by reference. Thermally-conductive glue, wire strapping, rubber band strapping, or capturing the elastomer component 1000 between the outer profile 301 of the electric motor 300 or other heat-generating component and the interior surface 651 of the tubing of a frame can be used to secure the elastomer component 1000 adjacent the electric motor 300 or other heat-generating component. In the example embodiment shown in FIGS. 1 and 2 the elastomer component 1000 may be glued into place, for example, and it may be sized such that upon installation a gap 1040 is left between the ends of the elastomer component 1000 to accommodate a wire pass through, for example, as depicted in FIGS. 5, 6, and 7.

Figure 3:
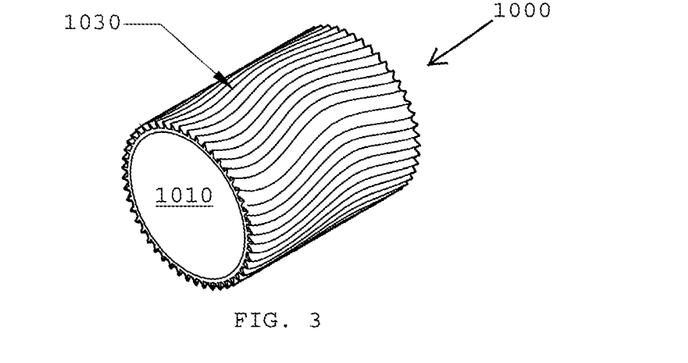
FIG. 3 is a perspective side view of a second example thermally conductive and compliant elastomeric device configured according various example embodiments for mounting heat generating components inside a tubular frame.
Figure 4:
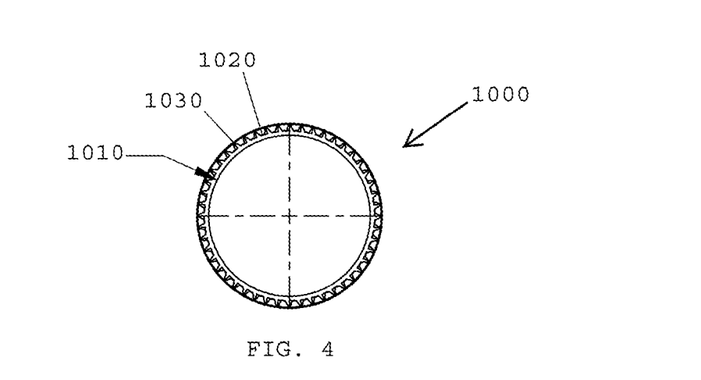
FIG. 4 is a top view, which is the same as the bottom view, of the second example thermally conductive and compliant elastomeric device of FIG. 3.

Turning to the example embodiment shown in FIGS. 3 and 4, the thermally conductive, compliant, flexible, resilient, elastomeric component 1000 may be formed as a one-piece longitudinally-extending annulus, or tube, sized to allow the elastomer component 1000 to stretch around a heat-generating component such as an electric motor 300, such that the relatively smooth first side 1010 forms a cylindrical (or other) shape that forms thermally-effective and substantially continuous compressive physical contact with a correspondingly-shaped outer profile 301 of the electric motor 300 or other heat-generating component that is to be mounted within the tubing of a frame. Elastomeric components 1000 that are molded-to-shape like those shown in FIGS. 3 and 4 may take other shapes in addition to cylindrical shapes to mate against different outer profiles of different heat-generating components and different inner profiles of frame tubes, including for example shapes comprising outer and inner profiles having any combination of cross-sectional shapes, including round, (circular or annular), oval, square, octagonal, rectangular, square or rectangular with radiused corners, irregular profiles, and profiles that change as they extend longitudinally, such as tapered shapes, including for instance conical, pyramidal, or frustrum shapes, or any other suitable cross-sectional shapes. In molded-to-shape embodiments such as those shown in FIGS. 3 and 4, no further attachment means, such as adhesive, may be necessary (though they may be used if desired), because the elastomeric component 1000 automatically form-fits to, and resiliently compresses itself against, the outer profile 301 of the electric motor 300 or other heat-generating component that is to be mounted within the tubing of a frame. Avoiding adhesive can be helpful in increasing the efficiency of heat conduction from the electric motor 300 or other heat-generating component to the elastomeric component 1000.

Figure 5:
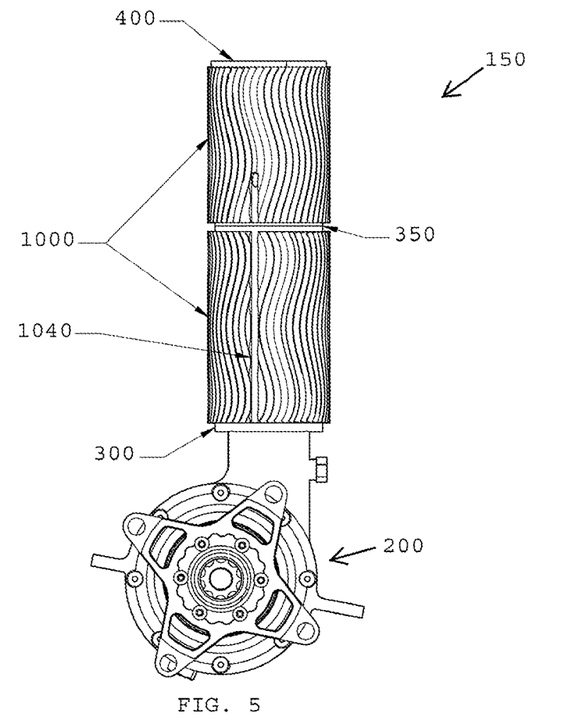
FIG. 5 is a right side elevation view of an example integrated unitary motor-controller-drive system for an electric bicycle including heat generating components, namely a controller and a motor, configured to be mounted inside a hollow tube of a frame, showing example thermally conductive and compliant elastomeric devices assembled with, and surrounding the outer profiles of, the heat generating components, according to various example embodiments.
Figure 6:
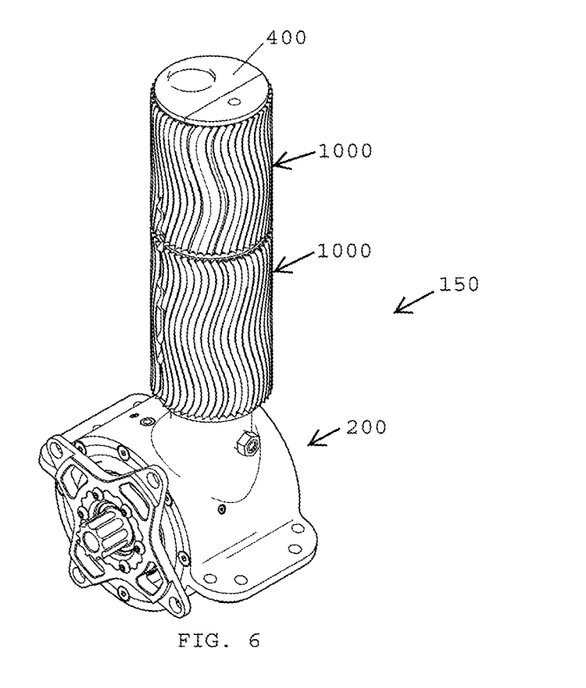
FIG. 6 is a top perspective view of the assembly of FIG. 5.

FIGS. 5 and 6 depict two thermally conductive, compliant, flexible, resilient, elastomeric components 1000 wrapped around and attached with the exterior profiles of a motor 300 and a motor controller 400 of an integrated unitary motor-controller-drive system 150 for an electric bicycle, which is configured to be installed at least partially into the frame of a bicycle, for instance all but part of the drive system 200 as shown and described in the '502 application incorporated herein. A gap 350 is shown between the two elastomeric components 1000. One or more wire-pass-through reliefs, spaces, or gaps 1040 may optionally be provided, either by providing a gap between the ends of the elastomer component 1000 shown in FIGS. 1 and 2, or by forming the elastomer component 1000 shown in FIGS. 3 and 4 with reduced or no protrusions 1030 on a longitudinally-extending portion, relief, or gap 1040 on surface 1020.

Figure 7:
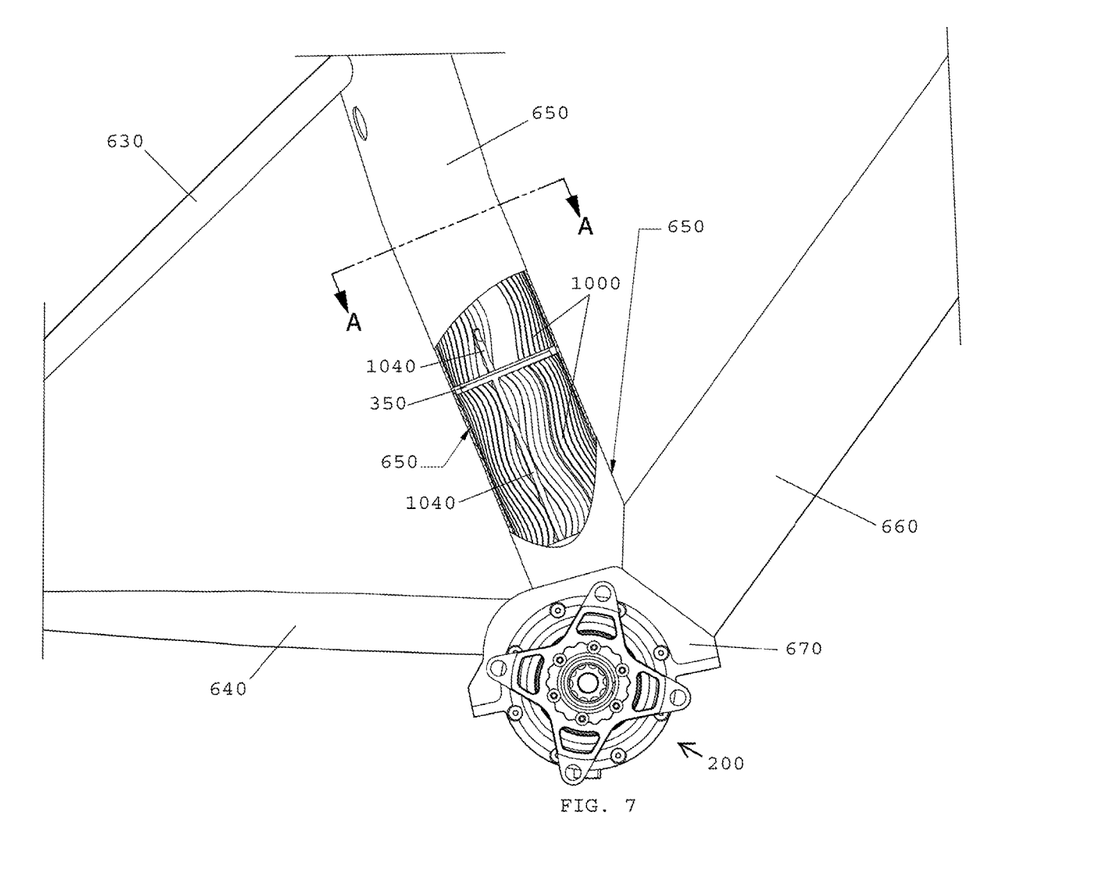
FIG. 7 is a side elevation view depicting the assembly of FIG. 5 installed inside a hollow tube of an example bicycle frame according to various example embodiments, shown partially cut away.
Figure 7A:
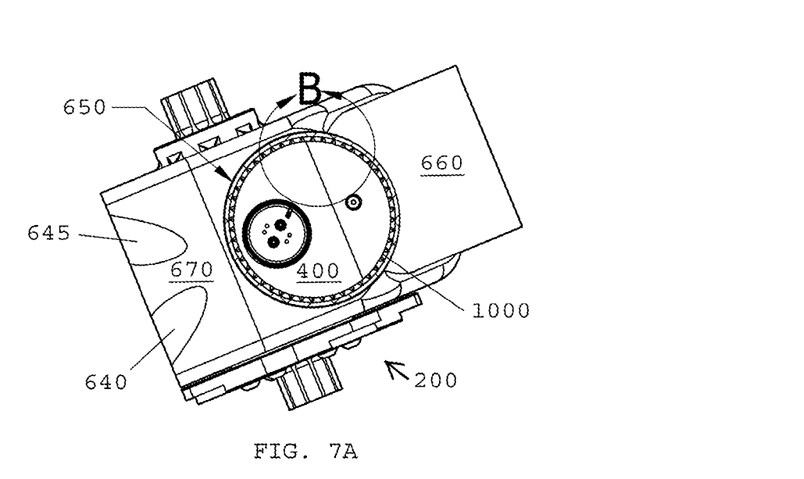
FIG. 7A is a section view of the installation of FIG. 7 taken along line A-A.
Figure 7B:
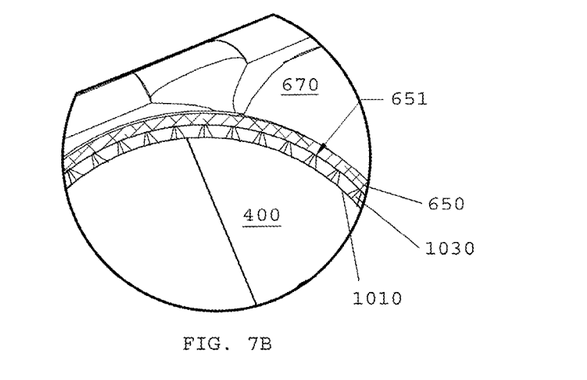
FIG. 7B is a detail view of the section view of FIG. 7A taken of area B.

With reference to present FIGS. 7, 7B, and 7C, and the figures and description in the incorporated '502 application, the motor 300 and a motor controller 400 of an integrated unitary motor-controller-drive system 150, both wrapped in elastomeric components 1000, are shown inserted into a seat tube 650 of a bicycle frame such that the protrusions 1030 are at least partially compressed against the interior surface 651 of the seat tube 650. In other words, the regularly-repeating protrusions 1030 extend away from the heat-generating components 300, 400 such that the regularly-repeating protrusions 1030 are in an interference fit with the interior surface 651 of the tubular frame 650 when the heat-generating components 300, 400 are mounted at least partially inside the frame tube 650. For reference, in this particular example embodiment the drive system 200 of the integrated unitary motor-controller-drive system 150 is attached with a bottom bracket shell 670 of the bicycle frame, which also includes a down tube 660, chain stays 640, 645 and seat stay 630. The frame tubes may be formed from any suitable material, though heat-conductive materials like steel and aluminum may function better for present purposes than more insulating materials. It is understood that while the particular embodiment shown in FIG. 7 has heat generating components inserted into the seat tube 650, this is just an example; elastomeric components 1000 can be used similarly in connection with any heat generating components that are housed at least partially within any tube of any frame.

During operation of an electric bicycle or other device or machine that incorporates heat generating components within frame tubing, the electrical, electromagnetic, and mechanical systems that generate waste heat may be wrapped at least partially in thermally conductive, compliant, flexible, resilient, elastomeric components 1000, which effectively transfer that waste heat to the tubing of the frame in which they are mounted, and thus to the surrounding atmosphere, which tends to avoid overheating. Significant heat-producing components can include motors 300, motor controllers 400, gear trains or drive systems 200, and battery packs (shown in the '502 application), for example.

Wrapping heat-generating components (300, 400, etc.) at least partially in thermally conductive, compliant, flexible, resilient, elastomeric components 1000 also addresses the dimensional, vibration, and noise issues that arise when placing the heat-generating components directly against interior surfaces of a frame. The regularly-repeating protrusions 1030 are compliant and compressible or deformable, and allow for radial compliance or "dimensional forgiveness" during assembly and fitment of components within frame tubing, which may include misshaped and misaligned components and tubing. Further, undesirable vibrations and noises created by the heat-generating components are muted by the thermally conductive, compliant, flexible, resilient, elastomeric components 1000, which may act as a noise and vibration dampening member between the heat-generating components and the frame.

Any of the suitable technologies set forth and incorporated herein may be used to implement various example aspects of the invention as would be apparent to one of skill in the art. For example and not by way of limitation, inserts 200 may be adapted for use in tubes other than head tubes, such as swing arm tubes, bottom brackets, and the like, in bicycle frames, motorcycle frames, and any other suitable type of frame.

Although exemplary embodiments and applications of the invention are described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A system for mounting a heat-generating component having an exterior surface defining an outer profile at least partially inside a frame tube having an interior surface defining an inner profile, comprising:
   a thermally conductive and compliant elastomeric device comprising a base portion having a relatively smooth first side and regularly-repeating protrusions extending away from a second side opposite the first side;
   the thermally conductive and compliant elastomeric device wrapped at least substantially around the outer profile of the heat-generating component such that the relatively smooth first side of the thermally conductive and compliant elastomeric device is in substantially continuous physical contact with the outer profile of the heat-generating component, and the regularly-repeating protrusions extend away from the heat-generating component such that the regularly-repeating protrusions will be in an interference fit with the interior surface of the tubular frame when the heat-generating component is mounted at least partially inside the frame tube.

2. The system of claim 1, wherein the frame tube is part of a bicycle frame.

3. The system of claim 2, wherein the heat-generating device comprises an electric motor.

4. The system of claim 2, wherein the heat-generating device comprises an electric motor controller.

5. The system of claim 1, wherein the outer profile of the heat-generating component has a generally circular cross-section.

6. The system of claim 1, wherein the inner profile of the frame tube has a generally circular cross-section.

7. The system of claim 1, wherein the regularly-repeating protrusions form longitudinally-extending ridges extending across the second side of the thermally conductive and compliant elastomeric device.

8. The system of claim 7, wherein the longitudinally-extending ridges curve in an undulating wave pattern as they extend across the second side of the thermally conductive and compliant elastomeric device.

9. The system of claim 8, wherein the regularly-repeating protrusions have a cross-section where a portion of the protrusions closest to the second side is wider than a portion of protrusion furthest from the second side.

10. The system of claim 1, wherein the thermally conductive and compliant elastomeric device forms a longitudinally-extending relief allowing for the passage of wiring between the outer profile of the heat-generating component and the inner profile of the frame tube when the heat-generating component is mounted at least partially inside the frame tube.

11. The system of claim 1, wherein the thermally conductive and compliant elastomeric device comprises a planar slab of flexible material wrapped at least substantially around the outer profile of the heat-generating component.

12. The system of claim 1, wherein the thermally conductive and compliant elastomeric device comprises a one-piece longitudinally-extending annulus sized to allow the thermally conductive and compliant elastomeric device to stretch around and compressively engage against the heat-generating component.

13. A bicycle that receives at least part of its motive power from an electric motor, comprising a frame having a tube with an interior surface defining an inner profile, and a system for mounting a heat-generating component having an exterior surface defining an outer profile at least partially inside tube of the frame, comprising:

a thermally conductive and compliant elastomeric device comprising a base portion having a relatively smooth first side and regularly-repeating protrusions extending away from a second side opposite the first side;

the thermally conductive and compliant elastomeric device wrapped at least substantially around the outer profile of the heat-generating component such that the relatively smooth first side of the thermally conductive and compliant elastomeric device is in substantially continuous physical contact with the outer profile of the heat-generating component, and the regularly-repeating protrusions extend away from the heat-generating component such that the regularly-repeating protrusions are in an interference fit with the interior surface of the tubular frame when the heat-generating component is mounted at least partially inside the frame tube.

14. The bicycle of claim 13, wherein the frame tube is a seat tube.

15. The bicycle of claim 13, wherein the heat-generating device comprises an electric motor.

16. The bicycle of claim 13, wherein the heat-generating device comprises an electric motor controller.

17. The bicycle of claim 13, wherein the outer profile of the heat-generating component has a generally circular cross-section, and the inner profile of the frame tube has a generally circular cross-section.

18. The bicycle of claim 13, wherein the regularly-repeating protrusions form longitudinally-extending ridges extending across the second side of the thermally conductive and compliant elastomeric device.

19. The bicycle of claim 18, wherein the longitudinally-extending ridges curve in an undulating wave pattern as they extend across the second side of the thermally conductive and compliant elastomeric device.

20. The bicycle of claim 13, wherein the thermally conductive and compliant elastomeric device comprises a one-piece longitudinally-extending annulus sized to allow the thermally conductive and compliant elastomeric device to stretch around and compressively engage against the heat-generating component.

* * * * *